US007269118B2

(12) United States Patent
Alpert et al.

(10) Patent No.: US 7,269,118 B2
(45) Date of Patent: Sep. 11, 2007

(54) METHOD AND APPARATUS FOR RETRIEVING INFORMATION FROM A 3D STORAGE MEDIUM

(75) Inventors: Ortal Alpert, Jerusalem (IL); Thierry Wasserman, Tel Aviv (IL); Yair Salomon, Jerusalem (IL); Ori Eytan, Haifa (IL)

(73) Assignee: Mempile Inc., Wilmington, DE (US)

( * ) Notice: Subject to any disclaimer, the term of this patent is extended or adjusted under 35 U.S.C. 154(b) by 284 days.

(21) Appl. No.: 10/507,101

(22) PCT Filed: Mar. 11, 2003

(86) PCT No.: PCT/IL03/00199

§ 371 (c)(1),
(2), (4) Date: Mar. 26, 2005

(87) PCT Pub. No.: WO03/077240

PCT Pub. Date: Sep. 18, 2003

(65) Prior Publication Data

US 2005/0162996 A1    Jul. 28, 2005

Related U.S. Application Data

(63) Continuation-in-part of application No. 10/096,369, filed on Mar. 13, 2002, now Pat. No. 6,865,142.

(60) Provisional application No. 60/363,041, filed on Mar. 11, 2002.

(51) Int. Cl.
*G11B 7/00* (2006.01)

(52) U.S. Cl. ...................................... 369/100; 369/288

(58) Field of Classification Search .................... None
See application file for complete search history.

(56) References Cited

U.S. PATENT DOCUMENTS

| 4,999,810 | A | * | 3/1991 | Vo-Dinh ..................... 369/126 |
| 5,268,862 | A | * | 12/1993 | Rentzepis .................... 365/151 |
| 5,325,342 | A | | 6/1994 | Vo-Dinh et al. |
| 5,592,462 | A | | 1/1997 | Beldock et al. |
| 6,009,065 | A | * | 12/1999 | Glushko et al. .............. 369/94 |
| 6,034,929 | A | | 3/2000 | Jacabowitz et al. |
| 6,115,333 | A | | 9/2000 | Igarashi |
| 6,128,267 | A | | 10/2000 | DeCusatis et al. |
| 6,233,210 | B1 | | 5/2001 | Schell |
| 6,291,132 | B1 | | 9/2001 | Levich et al. |
| 6,738,322 | B2 | | 5/2004 | Amble et al. |
| 6,970,414 | B1 | * | 11/2005 | Pavel ......................... 369/103 |
| 2001/0002895 | A1 | | 6/2001 | Tsutomu et al. |
| 2001/0040844 | A1 | | 11/2001 | Sato et al. |

FOREIGN PATENT DOCUMENTS

WO    WO 0173779    10/2001

* cited by examiner

*Primary Examiner*—William Korzuch
*Assistant Examiner*—Peter Vincent Agustin
(74) *Attorney, Agent, or Firm*—Browdy and Neimark, PLLC

(57) ABSTRACT

A method and apparatus for retrieving information from a three dimensional storage medium uses a three dimensional storage medium having an active medium capable of exhibiting first and second states, a data unit being represented by the ratio between the concentration of the first and second states in a given volume portion of the medium and a data sequence is represented by a sequence of data units. The active medium is irradiated with light as to concentrate light flux through a volume portion of the storage medium so as to generate in the volume portion a detectable non-linear optical response characteristic of the concentration ratio, which is detected and used for tracking.

39 Claims, 6 Drawing Sheets

METHOD AND APPARATUS FOR RETRIEVING INFORMATION FROM A 3D STORAGE MEDIUM

FIELD OF THE INVENTION

The invention relates to methods and apparatus for reading information from a 3D optical storage medium.

BACKGROUND OF THE INVENTION

It has been suggested in the art, to store information in three dimensional optical storage apparatuses. One of the problems to be solved in such systems is how to read information from a particular point without letting the reading light beam being distracted by the storage medium positioned between the reading light source and the said particular point.

WO 01/73779 co-owned by the owner of the present invention, suggests reading the information by two-photon absorption. In this method, the information stored in a particular point is characterized by the absorption coefficient in a certain frequency $v$, and the reading is carried out with two light beams having frequencies $v_1$ and $v_2$, so that $v_1+v_2=(v_1-v_2=v$ is also possible). Only when the two light beams intersect, the light may be absorbed and reading takes place. In all the points where the two beams do not intersect, there is no light of frequency $v$, and therefore no reading. The storage medium should be transparent to light having a frequency $v_1$, and also to light having the frequency $v_2$.

Regarding the storage means, it is suggested in WO 01/73779 to use a matrix carrying stilbene derivatives, having one characteristic absorption in a given frequency when in the cis isomer and another, when in the trans.

In optical storage media such as optical disks in general and DVDs in particular, data is stored along tracks formed in the bulk of the optical disk and is read by focusing a laser beam produced by semiconductor diodes on to the tracks, while spinning the disk on its axis. The tracks generally comprise spiral tracks on which data is written and from which the data is read.

Obviously in order to retrieve data correctly it is essential that the reading head can locate and follow a desired track. In practice this leads to two different kinds of tracking problem: skipping from one track to another and faithfully following a single track. For the purpose of the present discussion, it suffices to observe that these two different tracking problems require different solutions and to the extent that the method of tracking is relevant to the present invention, the present invention is concerned only with the second of the two problems.

U.S. Pat. No. 5,592,462 (Beldock) issued Jan. 7, 1997 entitled "Three-dimensional optical data storage and retrieval" discloses a three dimensional optical data storage and retrieval system having a three dimensional optical data storage medium and an apparatus for providing access to data stored on the medium. In accordance with one aspect, the data storage medium includes a number of concentric shells each of which has a curvilinear data storage surface for storing data in a number of substantially parallel data tracks. According to another aspect, the data storage medium includes a number of data storage surfaces, which are rotatable about a corm non axis, each data storage surface for storing data in a number of substantially circular data tracks and having an optically transparent window, which transects each of the data tracks. In use, each shell or data storage surface is rotated about a common axis and tracking is achieved by directing the reading beam through the optically transparent windows on to a data track of interest. Thus, this reference is not applicable to retrieving data from a solid optical storage medium wherein the data is stored in multiple layers.

The manner in which CD and DVD reading head track a destination track is based on focusing the reading spot on to the track and measuring the intensity of a reflected spot by position sensitive detectors. This allows calculation of the position of the reading spot and subsequent adjustment of the reading head's location based on the measured error.

U.S. 20010040844 published Nov. 15, 2001 (Sato et al.) entitled "Tracking servo apparatus of optical information recording and reproducing apparatus" discloses a tracking servo apparatus using this technique. Thus, reflection light obtained when a laser beam is irradiated onto a recording surface of an optical disc is photoelectrically converted, thereby obtaining a photoelectric conversion signal. A tracking error signal showing an amount of deviation of an irradiating position of the laser beam for a track in a disc radial direction on the recording surface is generated by the photoelectric conversion signal. A spherical aberration occurring in an optical system is detected, a level of the tracking error signal is corrected on the basis of the detection result, and the irradiating position of the laser beam is moved in the disc radial direction in accordance with the level-corrected tracking error signal.

Likewise, U.S. Pat. No. 6,233,210 published May 15, 2001 (Schell; David L.) entitled "Optical drive error tracking method and apparatus" discloses a method and apparatus for obtaining a tracking error signal for an optical disk player which is general across the various data formats found in CD audio disks and DVDs. A photodetector having at least four active areas is used to sense the reflected laser beam. A differential amplitude tracking error signal is generated by comparing the signal strength in the different active areas.

These references are typical of known solutions for maintaining the read/write head in communication with a desired track using a photodetector having multiple sections that serves as a position-sensitive detector for detecting a component of the read/write laser beam reflected from the surface of the optical disk.

For both CDs and DVDs, axial compensation translates to a focusing adjustment of the read/write beam.

SUMMARY OF THE INVENTION

It is an object of the invention to provide a method and system for retrieving information from a three dimensional storage medium.

It is a further object of the invention to correct tracking errors in such a method and system where the read spot may drift in two essentially orthogonal directions.

In accordance with a broad aspect of the invention, there is provided a method for retrieving information from a three dimensional storage medium, the method comprising:

using a three dimensional storage medium comprising an active medium capable of being in two states, wherein a data unit is represented by the ratio between the concentration of the first and second of said two states in a given volume portion of said medium and a data sequence is represented by a sequence of such data units;

irradiating said active medium with light as to concentrate light flux through a volume portion of said storage medium so as to generate in said volume portion a detectable non-linear optical response characteristic of said concentration ratio;

detecting said non-linear optical response to retrieve information stored in said volume portion; and tracking a data sequence for retrieving said data sequence in a reproducible manner.

Within the context of the description and appended claims, the term "data unit" refers to a bit or symbol of a finite alphabet. Preferably, the data sequence is tracked via a tracking feedback signal for positioning the light at a predetermined volume portion of the storage medium.

According to a further aspect of the invention there is provided a method for correcting tracking errors in an optical storage medium having multiple tracks arranged in different layers of the optical storage medium, the tracking comprising:
  (a) directing a reading spot that is nominally focused on to a track in the optical storage medium,
  (b) continually moving the reading spot in axial and radial directions,
  (c) receiving a signal having an amplitude which varies according to respective offsets from the track in radial and axial directions,
  (d) using the received signal to determine a direction of a respective offset from the track in radial and axial directions, and
  (e) adjusting a location of the reading spot accordingly.

Any active medium known in the art is suitable for use according to the present invention. Some non-limiting examples to active media are those described in WO 01/73779 and in U.S. Pat. No. 5,268,862, both of which are incorporated herein by reference, stillbene derivatives, and azobenzene derivatives.

The active medium is preferably embedded in a supporting matrix, for instance, as a dopant or, when the supporting matrix is a polymer, as a monomer co-polymerized with the supporting matrix. The supportive matrix should be transparent for the light irradiated on it by the method of the invention and to the light generated by the non-linear optical process. Non-limiting examples of supportive matrices suitable for use according to the present invention are polyethylene, polypropylene, polycarbonate, and polymethylmetacrilate (PMMA).

Typically, the data is stored in a binary mode, so that the concentration ratio representing one digit is 1:0 and the concentration ratio representing the other digit is 0:1. Here, 1 and 0 are not absolute values but rather should be interpreted as the highest and lowest concentrations that may be achieved during the writing process, which is not discussed herein.

As an alternative to storing the data in binary mode, other schemes may be devised where the there are more than two states of the media (e.g. completely in isomerics states A or B, in the thermal equilibrium or close to it, in one of a multitude of photo stationary states and more). The size of the alphabet used in the encoding-decoding process depends on the encoding-decoding method used and on the signal separation and the signal resolution (signal to noise ratio) of the system. Many encoding-decoding methods are known in the art, DC free and run length limited encoding-decoding are non-limiting examples of such families of codes.

The size of the volume portion from which a data unit is retrieved according to the invention is the size of the light spot wherein the flux is large enough to generate a detectable non-linear reaction. Generally, smaller spot sizes may compensate for weaker light intensities. Therefore, working with spots having a radius of less than 30 μm is advisable, and spots having a radius equal to or smaller than the wavelength of the irradiated light is preferable.

Small spots allow the use of cheaper light sources. However, it may be beneficial to work at high intensity of a given light source, even if a non-linear response is detected at lower intensities. This is so because above some intensity, due to saturation effects, the response is no longer sensitive to the intensity, and the reading is also not sensitive thereto. This way noise may be reduced from the measurement.

Detection of the signal requires its separation from other light signals that may exist in the environment. Such separation may be achieved by any method known for this purpose in the art, such as directing the non-linearly generated signal into a direction where it is the only source for light of its frequency by satisfying phase matching conditions; filtering the light through a filter, prism, grating, polarizers, etc.; using phase sensitive detection, lock-in amplifier, a box-cars, and/or gated averaging method. All the available methods may be applied whether the beams irradiating the active medium are collinear or not.

Non-linear optical processes are very sensitive to the flux of light. As the flux varies as a function of volume element when a beam of light is focused through matter, a dramatic increment in the effective efficiency occurs when approaching the focal point. The effective result of this is that with the appropriate photon flux, the process occurs only at the locus of maximal power, that is the focal point. When using a single light source at a single wavelength, this focal point is straightforwardly defined as the location where the beam waist is minimal.

When using more than one wavelength the most efficient way to achieve the same effect of high localization is by overlapping the focal point of all photon sources involved in the relevant process. When different foci are not exactly overlapping, the same process occurs, albeit less efficiently, in the volume generated by the crossing of the effective volume elements generated by the foci of all light sources. To gain additional effective efficiency in a one-wavelength process higher fluxes can be achieved through the use of more than one light source using the same methods as for the multi-wavelength case.

The superposition principle allows one to consider a single beam as a plurality of beams whose respective foci are trivially located in the same location. Therefore within the context of the present invention and the appended claims where reference is made to two or more intersecting light beams, it is to be understood that a single light beam may give rise to a non-linear process analogous to the overlapping of two or more monochromatic beams, and this is encompassed by reference in the claims to the intersection of two or more light beams.

One family of non-linear optical responses suitable for use according to the present invention is a multi-photon fluorescence, such as, but not limited to, two-photon fluorescence.

Non-limiting examples of non-linear optical responses related to a $\chi^{(n>2)}$ process, are four wave mixing processes such as Stimulated Raman Scattering, Coherent Anti-Stokes Raman Scattering (CARS), Raman induced Kerr effect, and degenerate four-wave mixing. Similar $\chi^{(5)}$ processes and higher are also known in the art and may be used according to the present invention.

According to another aspect of the present invention there is provided an apparatus for retrieving information from a three dimensional storage medium by generating a non-linear optical response of said storage medium, detecting said non-linear optical response and analyzing and processing it. Such an apparatus includes, in order to generate and detect a non-linear optical response, at least one light source, which in some cases (such as CARS) must be coherent; a detector for detecting light, which is different in at least one characteristic from the light provided by said light sources. In this context, examples of light characteristics are the light wavelength, polarization, and propagation direction. And means for tracking, i.e. process the signals received from the medium to get a tracking feedback signal and correct the location of the read spot accordingly. The apparatus may also include means, known per se in the art for analyzing and processing detected signals and retrieving information therefrom. These may comprise means for digitizing the detected signal, such as an A/D converter, and an algorithmic error detection means, such as error detector code running on a computer or on an electronic chip.

A light source according to the present invention may be an active light source like a laser, or a passive light source like a mirror. A beam splitter, for example, may be considered as two (passive) light sources.

According to one embodiment of the invention the data sequences are arranged as layers within the medium, each layer consisting of a spiral track of the respective data sequences, where the medium is shaped as a disk, and rotated around its axis by the apparatus. The purpose of the invention is to track the spiral track corresponding to a required data sequence in r and z coordinates when the disk rotates. It is assumed that the track suffers limited amount of run-out both in r (radial run-out) and z (axial ran-out) coordinates. Such distortions can occur in the event that the axis of rotation is slightly off the disk center and slightly non-parallel to the disk plane normal, such that the data spiral moves relative to the reading spot while the disk rotates. The invention enables tracking the data spirals by calculating a tracking error signal that is used as feedback for the servo-mechanisms that control the r and z position.

The basic tracking principle is to perpetually move (modulate) the reading spot in a periodical path around its nominal current position (traveling the r-z plane by two orthogonal functions of time). This modulation causes a modulation in amplitude and phase of the read signal that depends on the position of the reading spot relative to the data spiral. This dependence is used to determine the tracking error.

As a simplified example of the way the tracking algorithm calculates an error signal, consider a 2-D case. Assume the z coordinate is fixed such that the lasers spot is focused at the proper height and there is no axial run-out. As the reading spot propagates along the track, the spot's radial position is modulated in the radial direction so that the spot is half the time in (towards the center of the disk) and half the time out relative to the track (i.e. $r<r_0$ half of the time and $r>r_0$ half of the time). It should be noted that the offset relative to track center has to be small to ensure that signal is still detected with a signal to noise ratio that is high enough for other functions such as symbol detection or synchronization to be accomplished. If the signal has a fixed average and the tracking is perfect, than the average of the 'in' signal (signal detected when spot is 'in' relative to the track) is equal to the 'out' signal. If the spot's position begins to diverge from the track's position e.g. because of eccentricity of the disk, the expansion of the spiral or some other reason, then the difference between the 'in' and 'out' parts of the modulated signal, out-in, is negative if there were a small 'run-out' or positive if there was 'run-in'.

Two main factors determine the frequency of the modulation. It should be high enough to be able to respond to fast changes of the relative location of the track and the spot, but low enough to average enough data units so that the signal will be independent of the stored data. The averaging of the data can be accomplished by window integration or other appropriate low pass techniques. To ensure that in each integration window the signal is data-independent, DC free encoding techniques are used.

In another embodiment of the tracking mechanism the error signal calculation is accomplished by multiplying (inner product) the time variation of the data envelope (the read signal) with the reading spot modulation function. In this scheme the error signal is weighted by the strength of the modulation, i.e. signal measured when the amplitude of the modulation is high contribute more to the error signal. Further refinement of the invention is to include delay compensation before the multiplication between the signal and the modulation.

The tracking errors are used as feedback signals for the servo machine controlling the nominal spot position.

BRIEF DESCRIPTION OF THE DRAWINGS

In order to understand the invention and to see how it may be carried out in practice, specific embodiments will now be described, by way of non-limiting example only, with reference to the accompanying drawings, in which.

DETAILED DESCRIPTION OF INVENTION

Figure 1:
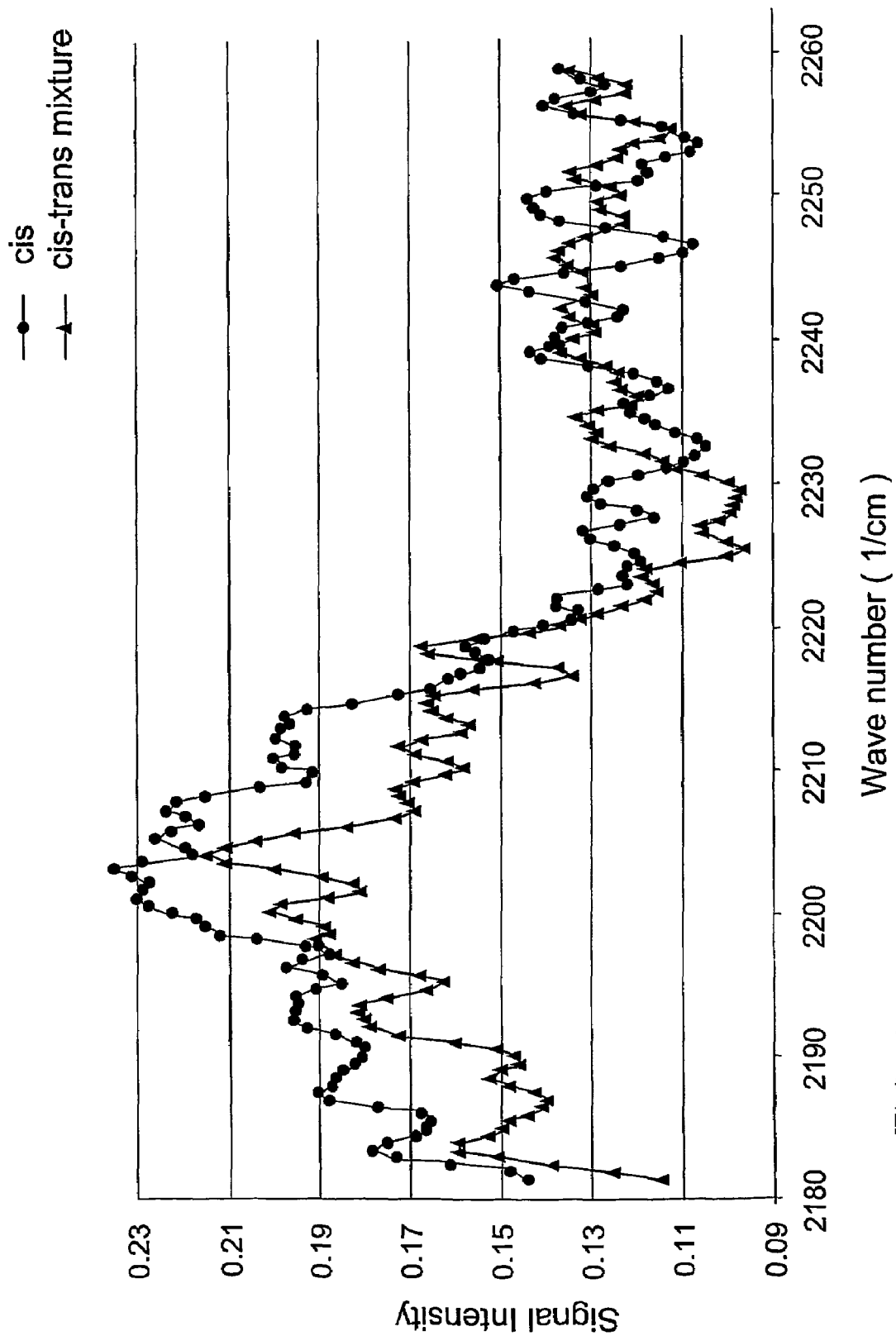
FIG. 1 is a graph showing CARS spectra of solid solutions having two different concentration ratios between cis and trans isomers of a given compound.

A solid solution of 10% cis-4,4'-dimethoxy-α,α-diciano stillbene (hereinafter compound A) in PMMA was irradiated with collinear laser beams of 844 and 1037 nm that were focused through a lens to a spot smaller than 10 µm. CARS signal at a wavelength of 711 mn was detected. The spectra of the signal detected from a solid solution of the cis isomer and of a cis-trans mixture is given in FIG. 1.

Figure 2:
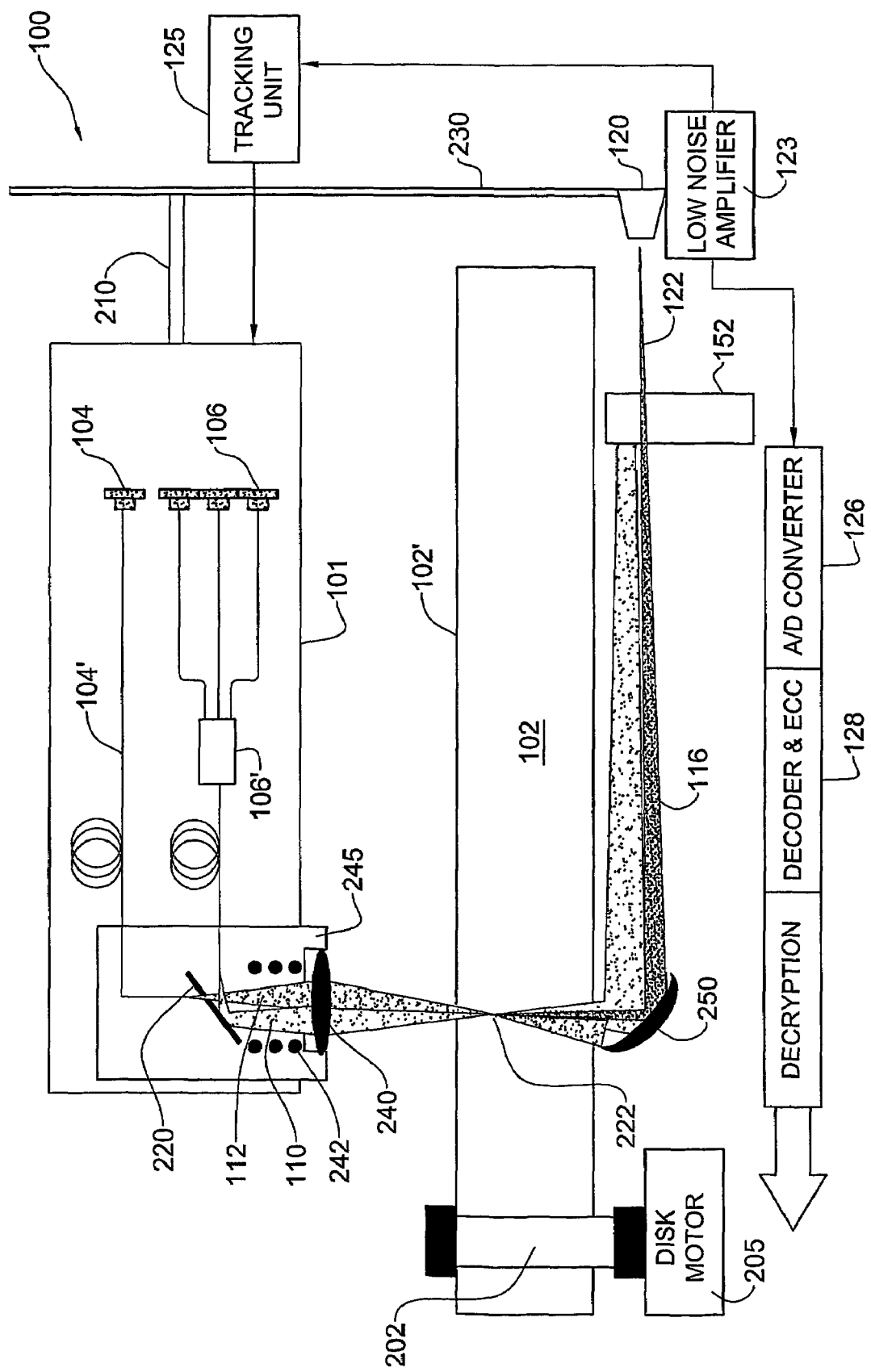
FIG. 2 is a schematic illustration of an apparatus according to the present invention.

FIG. 2 is an illustration of an apparatus 100 according to the present invention for retrieving information from a three dimensional storage medium (hereinafter referred to as "disk") 102 having an information carrying volume (not shown). The apparatus 100 includes two lasers 104 and 106, each being a source for a beam of coherent light (110 and 112 respectively), and a detector 120 for detecting a beam of coherent light 116 which is of different wavelength to the light provided by the lasers 104 and 106. The detector 120 transfers an electric signal, created therein due to the detection of an optical signal produced by the beam of coherent light 116, to a low noise amplifier 123, which can be a lock in amplifier to a tracking unit 125, so that the data sequence may be faithfully followed, and to an A/D converter 126, whose output is fed to a decoder and error detection and correction (ECC) unit 128 (constituting an algorithmic error detector), so that information encoded in the data sequence may be retrieved.

In the embodiment shown in FIG. 2 there is also a disk mount 202 for mounting thereon the disk 102, so that the disk, when mounted, may be rotated around its center by a motor 205. The two light sources 104 and 106 are connected to two optical fibers 104' and 106' arranged to direct the light signals 110 and 112 to a dichroic mirror, 220. The signal 112 is transferred through the mirror and the signal 110 is reflected thereby. Thus, the light may irradiate the disk 102, in such a manner that the beams common focus 222 is located within the information carrying volume of the disk 102.

The optical unit 101 is mounted on an arm 210, which may rotate around an arm axis 230. A lens 240, of the kind used in CD players, is positioned between the dichroic mirror 220 and the disk 102. Its position in the direction parallel to the disk's surface 102' is controlled by the combination of the rotations of the arm 210 around the arm axis 230 and the disk 102 around the disk mount 202. Its position in the direction perpendicular to the disk's surface 102' is controlled by a magnetic coil 242, which is also used to control small radial motions of the lens and thus the position of the common focus 222 within the disk 102 may be fully controlled. To achieve tracking, the location of the common focus is modulated by moving the lens 240 by applying a periodical electric signal to the magnetic coil 242. The coherent light sources 110 and 112 in combination with the dichroic mirror 220, the lens 240 and the magnetic coil 242 constitute an optical system 245. A collecting mirror 250 is positioned to collect the non-linearly generated signal 116 and directs it to the detector 120, positioned near the arm axis 230, through a filter 152. The laser drivers are not shown in FIG. 2.

The large ratios between the radius of the motion of the optical unit 101 around its axis 230 and track radius on the one hand and the size of the spot and the distance between adjacent tracks and layers on the other hand allow the approximation that the motion controlled by the rotation of the optical unit 101 around its axis is essentially orthogonal to the track of the data sequence.

To track, the system is provided with a tracking servo system shown generally as 125, which feeds a correction signal to the magnetic coil 242 for moving the lens 240 under control of the tracking error signal to nominally position the beam spots at the center of the track so that the tracking error signal is zero. Coarse motion of spot is achieved by motion of the optical unit as a whole. Fine motion is achieved by the motion of the lens using the magnetic coil 242.

Although the tracking system 125 shown in FIG. 2 serves to track the data sequence recorded on the specific disk 102 as described above, it is to be noted that the invention encompasses a novel tracking system, which is well-suited for use in the apparatus 100 described above with reference to FIG. 2 although it is also suitable for use in other optical data retrieval systems. Likewise, it is to be noted that other tracking systems may be employed in the apparatus 100.

The improved tracking system according to the invention is described below with particular reference to FIGS. 4a, 4b and 5 of the drawings. However, by way of general introduction there will first be described functionally with reference to FIG. 3 a read/write system 300 for a 3-D optical storage medium 102 having a tracking system. To the extent that the read/write system 300 includes components that are common to the apparatus 100 shown in FIG. 2, identical reference numerals will be employed.

The read/write system 300 comprises a rotary shaft 302 driven by an appropriate driving motor 205 for rotating the optical storage medium 102 set thereon, and an optical unit 101 for reading information from one of the tracks in the optical storage medium 102.

The optical unit 101 comprises semiconductor lasers 104 and 106 for radiating a pair of intersecting light beams having a volume of intersection that forms a "spot". Also included within the optical unit 101 is an optical system 245 for creating a focused spot whose location is controlled by an actuator 306, which in the particular embodiment shown in FIG. 2 is constituted by the magnetic coil 242. The optical unit 101 is driven by a motor 307 so as to produce the required coarse and fine motion of spot described above.

The system further comprises a laser driving circuit 308 for energizing the semiconductor lasers 104, and 106 to emit the respective laser beams.

In order to retrieve information from a desired track on the optical storage medium 102, the optical focus 222 must be kept on the desired track. To this end, the system is provided with a tracking servo system shown generally as 125, which feeds a correction signal to the lens actuator 306 for moving the optical system 245 under control of the tracking error signal to nominally position the beam spots at the center of the track so that the tracking error signal is zero.

Figure 3:
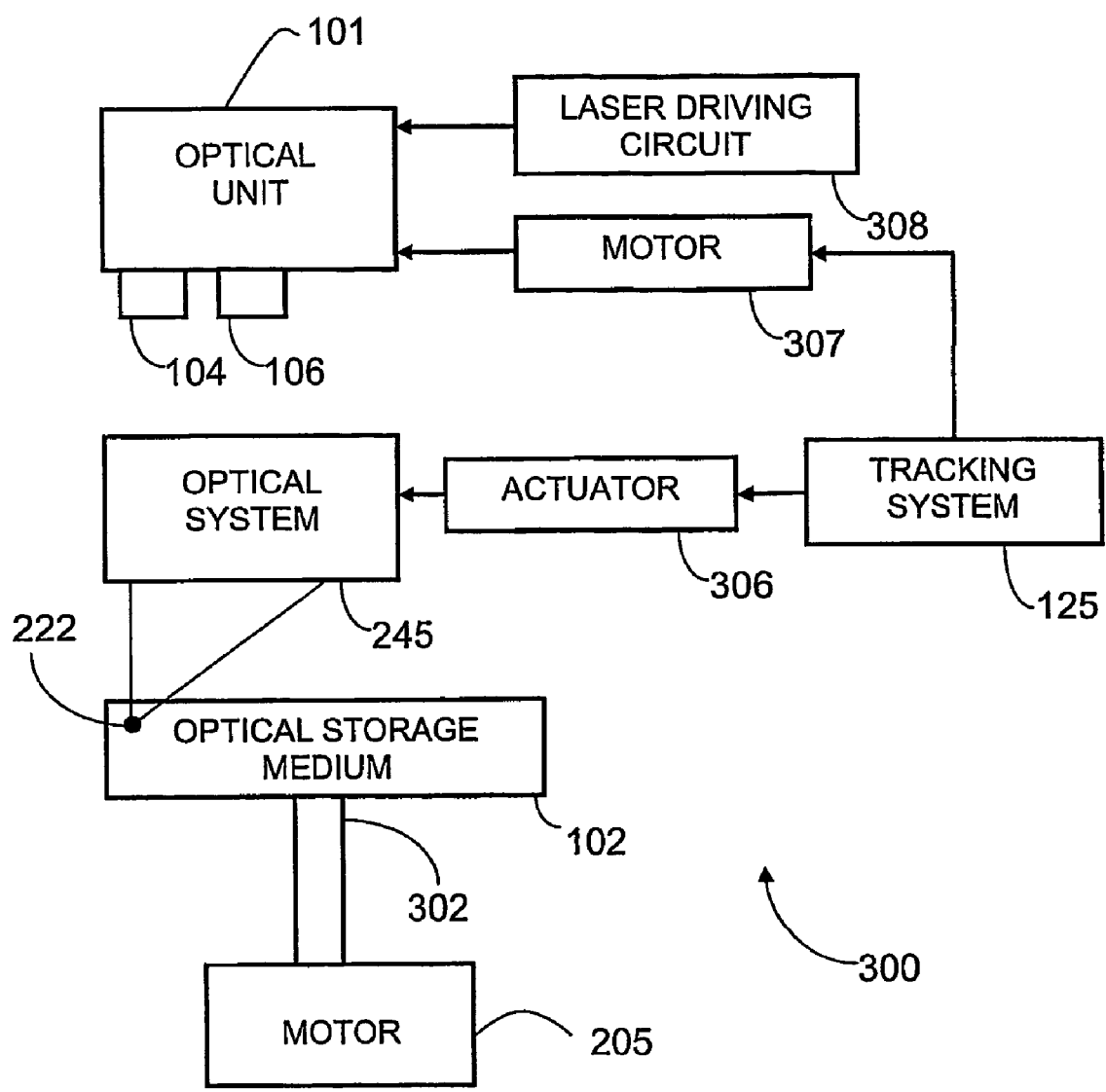
FIG. 3 is a block diagram showing functionally a read/write system for use with the invention.
Figure 4A:
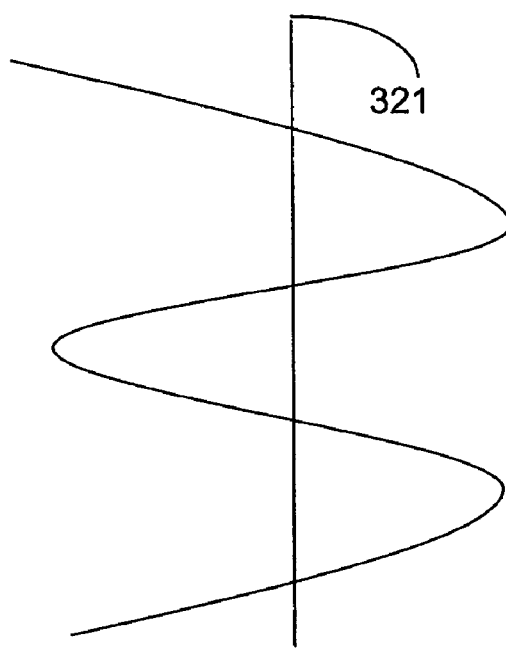
FIGS. 4a and 4b are pictorial representations showing the effect of sinusoidally modulating the position of the reading head in the system of FIG. 2.
Figure 4B:
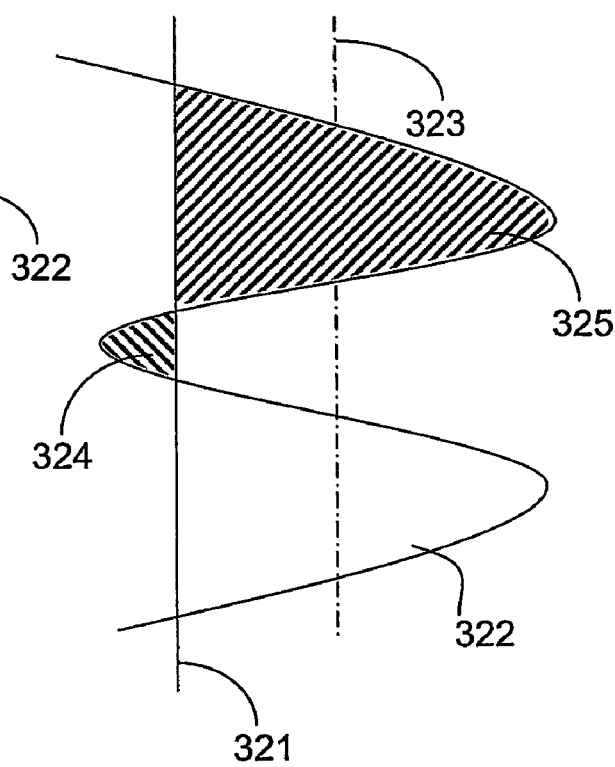

FIGS. 4a and 4b shows pictorially the effect of sinusoidally modulating the position of the optical focus 222 in the system of FIGS. 2 and 3. So far as the reading spot is concerned it trades data written into a continuous linear data track 321 while being subjected to spatial modulation that shifts its position continually from one side of the track to the other. Although the data is stored in tracks, the invention relies on the principle that even if the optical focus 222 is slightly off-center, data signal will still be read, albeit at reduced intensity. Thus, the further off-center the optical focus 222 is moved, the lower will be the magnitude of the data signal.

Thus, with reference to FIG. 4a, consider the case where the tracking is perfect and the reading spot is symmetrical with respect to the data track 321, its position being shown by the sinusoidal curve 322. In this case, the average signal will be equal on both sides of the data track 321. However, in the case of imperfect tracking as shown in FIG. 4b, the reading spot is asymmetrical with respect to the data track 321, its actual line of symmetry being depicted by a dotted center-line 323, shown to right of the data track 321. The signal is inversely proportional, in perhaps a non-linear fashion, to the distance of the sinusoidal curve 322 from the data track 321. Thus, in FIG. 4b where the sinusoidal curve 322 is offset to the right of the data track, this results in a lower signal from samples made when the sinusoidal curve 322 is to the right of the center line 323, thus indicating the spot is offset to the right of the data track 321 and must therefore be shifted to the left in order to correct the offset.

The tracking operates on the principle that by continually reading the data and, at the same, continually modulating the position of the reading head, the resulting moving average signal intensity that is read may be used to indicate to which side, both axially and radially, the reading head is located. This having been determined, the reading head may then be moved in an opposite direction until it is found to be disposed symmetrically relative to the track in both axial and radial directions.

Figure 5:
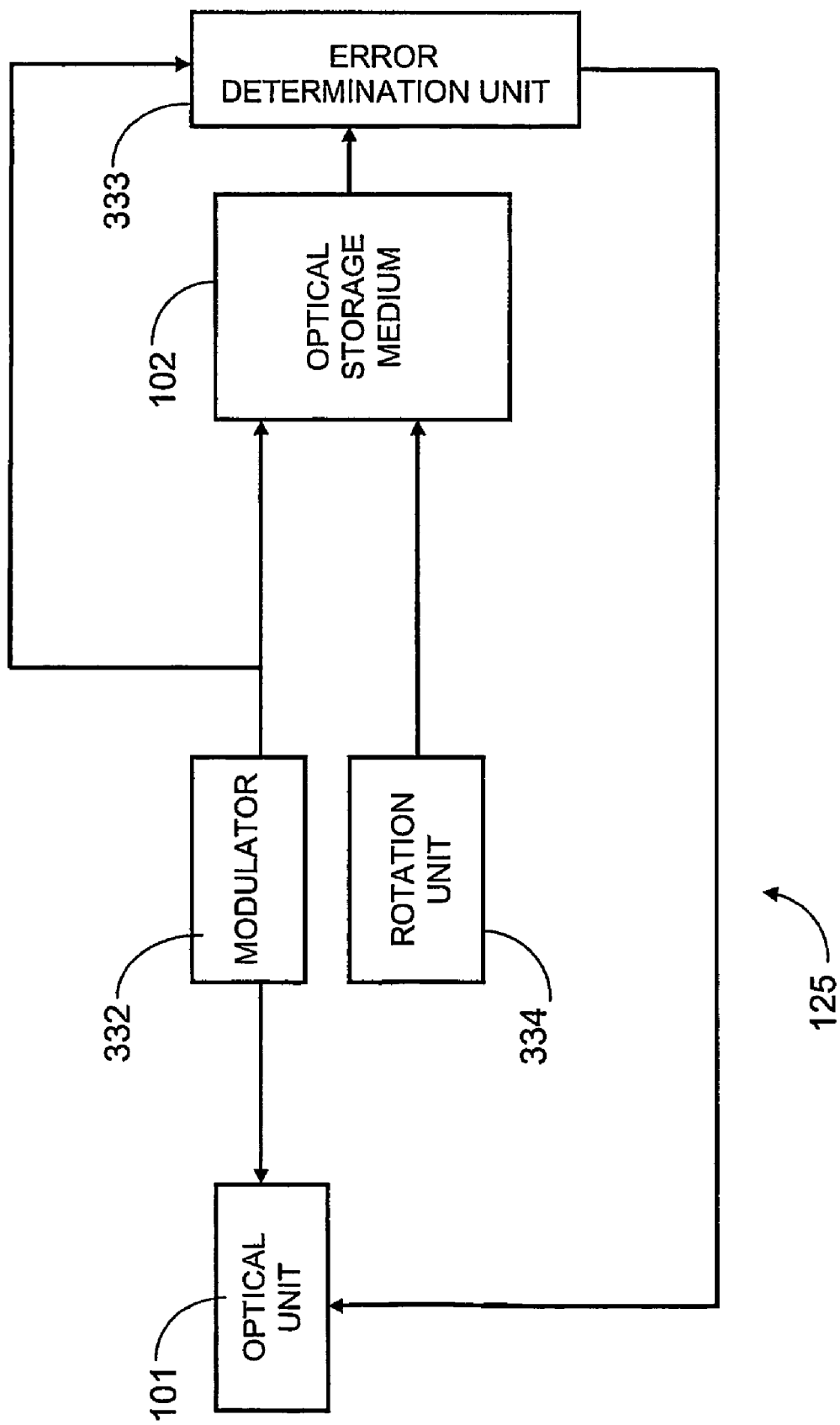
FIGS. 5 and 6 are block diagrams showing details of a tracking system for use with the system shown in FIG. 2.
Figure 6:
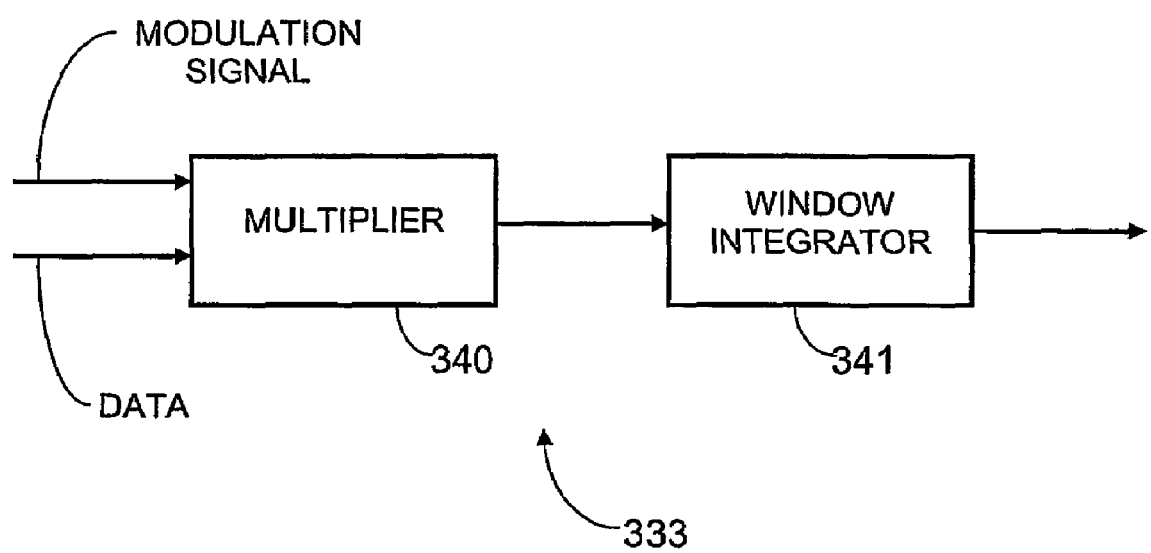

FIGS. 5 and 6 are block diagrams showing functionally details of a tracking system 125 that is described in polar coordinates (r, θ, z) defining a position of the beams' intersection in the optical recording medium. The tracking system behaves substantially identically for both radial and axial tracking. A modulator 332 spatially modulates the location of the optical focus 222 by a (r, z) modulation signal and feeds the resulting modulated data signal to the optical storage medium 102. The modulation signal itself is fed together with the measured data signal to an error determination unit 333, whose output is an error signal that is fed back to the optical unit 101 to correct the axial and radial offsets thereof. The modulator 332 in conjunction with the error determination unit 333 constitutes a tracking error correction unit. A rotation unit 334 provides a continuous change of θ.

FIG. 6 shows in simplified form the principal functionality of the error determination unit 333 comprising a first 2-input multiplier 340 to whose first input the (r, z) modulation signal is fed and to whose second input is fed the data signal read by optical unit 101 at the position (r, θ, z) in the optical storage medium 102. An output of the multiplier 340 is fed to a window integrator 341 which integrates the product of the data signal with the modulation signal so as to generate at its output a composite (r, z) error signal in the radial and axial directions.

As described above by way of example with reference to FIGS. 4a and 4b of the drawings, the modulation signal can be a sinusoidal function of the form m=(sin(ωt), cos(ωt))$^t$. The output of the window integrator may then be represented by:

$$\text{err}(t) = \int_{t-T}^{t} mI(t)dt$$

The intensity I(t) is inversely proportional in a non linear fashion to the distance from the center of the track. Thus, when the head is above the center of the track the modulation intensity is strongest, and it decays to zero when the head moves far from it. "T" represents the length of the time window of the integrator during which the modulated intensity is averaged. "T" should not be so large that it impacts negatively on the reaction time and creates distortions; but neither should it be too low since it is very difficult to construct a mechanical scanning system.

However, the modulation signal can be any suitable cyclic function which serves to move the optical focus 222 on either side, in both axial and radial directions, of the reading spot. Thus, it can be a square wave function or any other suitable cycle function. It is assumed that the frequency of the modulation signal is much lower than the frequency at which data is read. The window integrator 341 thus operates as a low pass filter.

The tracking operates on the principle that by continually reading the data and, at the same, continually modulating the position of the reading head, the resulting moving average signal intensity that is read may be used to indicate to which side, both axially and radially, the reading head is located. This having been determined, the optical focus may then be moved in an opposite direction until it is found to be disposed symmetrically relative to the track in both axial and radial directions.

Whilst the tracking method has been described with particular regard to a tracking system for use with a 3-D optical storage retrieval system wherein data is stored at voxels written in the bulk of the material, it will be understood that the principles of the invention are equally applicable to other kinds of optical storage media where data is stored as a quasi-linear data sequence.

The embodiment illustrated in FIG. 2 is only one of many embodiments available to the artisan when designing an apparatus according to the present invention. Some non-limiting examples for variations from this embodiment include: the lens and the mirror may be replaced by any other optical means which is known to bring to the same result, the optical fibers may be omitted or replaced by any other wave-guide, the combination of a disk mount and an arm axis may be replaced by any other means for controlling the location of the common focus in the plains parallel to the disk's surface 102', etc.

It should also be noted that although the preferred embodiment is directed to retrieval of data, the tracking system according to the invention is equally suitable for use when writing data to the optical medium.

The invention claimed is:

1. A method for retrieving information from a three dimensional storage medium, the method comprising:

using a three dimensional storage medium comprising an active medium capable of being in two states, wherein a data unit is represented by the ratio between the concentration of the first and second of said two states in a given volume portion of said medium and a data sequence is represented by a sequence of such data units;

irradiating said active medium with light as to concentrate light flux through a volume portion of said storage medium so as to generate in said volume portion a detectable non-linear optical response characteristic of said concentration ratio, the non-linear optical response being related to a $\chi^{(n)}$ process, where n is greater than 2, allowing for separating the non-linear optical response from other light signals due to a propagation direction characteristic of the non-linear optical response;

detecting said non-linear optical response to retrieve information stored in said volume portion; and tracking a data sequence for retrieving said data sequence in a reproducible manner.

2. The method according to claim 1, wherein the active medium includes stillbene derivatives, azobenzene derivatives, or mixtures thereof.

3. The method according to claim 2, wherein the active medium is embedded in a supporting matrix.

4. The method according to claim 3, wherein the active medium is doped into the supporting matrix.

5. The method according to claim 3, wherein the supporting matrix is a polymer.

6. The method according to claim 5, wherein the active medium is a monomer co-polymerized with the supporting matrix.

7. The method according to claim 3, wherein the supportive matrix is transparent to the light irradiated on it and to the light generated by the non-linear optical process.

8. The method according to claim 3, wherein the supportive matrix comprises polyethylene, polypropylene, polycarbonate, and/or polymethylmetacrilate (PMMThe), and/or other transparent polymeric material.

9. The method according to claim 1, wherein the irradiated light is focused to a spot halving a radius of the order of 30 μm of said irradiated light or less.

10. The method according to claim 1, wherein the intensity of the irradiated light is high enough for the generated signal to be independent thereon.

11. The method according to claim 1, wherein the non-linearly generated light signal is separated from other light signals that may exist in the environment by a filter, prism, monochromator or any other optical element known in the art.

12. The method according to claim 1, wherein the non-linearly generated light signal is separated from other light signals that may exist in the environment by satisfying phase matching conditions.

13. The method according to claim 1, wherein the non-linearly generated light is separated from other light signals that may exist in the environment by phase sensitive detection, a low-noise amplifier, a lock-in amplifier, a box-cars, gated averaging methods or any electronic method known in the art.

14. The method according to claim 1, wherein the large flux in the volume portion from which information is retrieved is achieved by focusing two or more collinear light beams at said volume portion.

15. The method according to claim 1, wherein the large flux in the volume portion from which information is retrieved is achieved by intersecting two or more focused light beams, each of which is monochromatic.

16. The method according to claim 1, wherein the non-linear optical process is a multi photon fluorescence process.

17. The method according to claim 16, wherein the non-linear optical process is a two-photon fluorescence process.

18. The method according to claim 1, wherein the non-linear process is selected from Coherent Anti-Stokes Raman Scattering (CARS), Degenerate Four-Wave Mixing (DFWM), Raman Induced Kerr Effect Spectroscopy (RIKES), and/or other four-wave mixing processes.

19. The method according to claim 1, wherein the data sequence is tracked via a tracking feedback signal for directing the light spot to a predetermined volume portion of the storage medium.

20. The method according to claim 19, further including correcting tracking errors in the optical storage medium by:
(a) directing a reading spot that is nominally focused on to a track in the optical storage medium,
(b) continually moving the reading spot in axial and radial directions,
(c) receiving a signal having an amplitude which varies according to respective offsets from the track in radial and axial directions,
(d) using the received signal to determine a direction of a respective offset from the track in radial and axial directions, and
(e) adjusting a location of the reading spot accordingly.

21. The method according to claim 20, wherein directing the reading spot includes directing at least two light sources whose volume of intersection constitutes the reading spot.

22. The method according to claim 20, wherein moving the reading spot includes modulating a position of the reading spot with a cyclic function.

23. The ,method according to claim 22, wherein the cyclic function is substantially sinusoidal.

24. The method according to claims 20, wherein receiving a signal includes:
i) reading a data signal with the reading spot,
ii) multiplying the data signal by a cyclic modulation signal to form a modulated data signal, and
iii) low pass filtering the modulated data signal.

25. The method according to claim 24, wherein low pass filtering includes window integrating the modulated data signal.

26. The method according to claim 1, further including analyzing and processing detected signals and retrieving information therefrom.

27. An apparatus (100) for carrying out the method of claim 1 for retrieving information from a three dimensional storage medium, the apparatus comprising:
a mount (202) for mounting thereon a three dimensional storage medium (102) comprising an active medium capable of being in two states, wherein a data unit is represented by the ratio between the concentration of the first and second of said two states in a given volume portion of said medium and a data sequence is represented by a sequence of such data units;
at least one source of coherent light (104, 106) for irradiating said active mediums with light as to concentrate light flux through a volume portion of said storage medium so as to generate in said volume portion a detectable non-linear optical response characteristic of said concentration ratio, the non-linear optical response being related to a $\chi^{(n)}$ process, where n is greater than 2, allowing for separating the non-linear optical response from other light signals due to a propagation direction characteristic of the non-linear optical response;
a filter (152) accommodated in an optical path of light coming from the medium to separate the non-linear optical response from other light signals
a detector (120) for detecting said non-linear optical response to retrieve information stored in said volume portion; and
a tracking unit (125) for tracking a data sequence for retrieving said data sequence in a reproducible manner.

28. The apparatus according to claim 27, wherein said non-linear optical response is characterized by predetermined wavelength, polarization, or both of these characteristics.

29. The apparatus according to claim 27, wherein the at least one source of coherent light includes an active light source.

30. The apparatus according to claim 29, wherein the active light source is a laser.

31. The apparatus according to claim 27, wherein the at least one source for coherent light includes a passive light source.

32. The apparatus according to claim 27, further including an algorithmic error detector (128) for analyzing and processing detected signals and retrieving information therefrom.

33. The apparatus according to claim 27, wherein the tracking unit (125) is adapted for tracking the data sequence via a tracking feedback signal for directing the light spot to a predetermined volume portion of the storage medium.

34. The apparatus according to claim 33, wherein the tracking unit (125) includes a tracking error correction unit for correcting tracking errors, the error correction unit comprising:
a position modulator (332) for modulating a position of the reading spot,
an error determination unit (333) for receiving a data signal having an amplitude which Varies according to respective offsets from the track in radial and axial directions, and is responsive to the data signal to determine a direction of a respective offset from the track in radial and axial directions, which offsets may be fed to the optical unit to correct radial and axial position errors of the reading spot.

35. The apparatus according to claim 34, wherein the reading spot is a volume of intersection of at least two light sources focused on the track.

36. The apparatus according to claim 34, wherein the position modulator is adapted to modulate a position of the reading spot with a cyclic function.

37. The apparatus according to claim 36, wherein the cyclic function is substantially sinusoidal.

38. The apparatus according to claim 34, wherein the error determination unit includes:
a multiplier (340) for multiplying the data signal by a cyclic modulation signal to form a modulated data signal, and
a low pass filter (341) for low pass filtering the modulated data signal.

39. The apparatus according to claim 38, wherein the low pass filter is a window integrator (341).

* * * * *